(12) United States Patent  
Miwa

(10) Patent No.: US 12,348,863 B2  
(45) Date of Patent: Jul. 1, 2025

(54) VIDEO TRANSMISSION SYSTEM, VIDEO TRANSMISSION METHOD, AND VIDEO RECEPTION DEVICE

(71) Applicant: Mitsubishi Electric Corporation, Tokyo (JP)

(72) Inventor: Shotaro Miwa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 133 days.

(21) Appl. No.: 18/286,560

(22) PCT Filed: Apr. 28, 2021

(86) PCT No.: PCT/JP2021/016888  
§ 371 (c)(1),  
(2) Date: Oct. 12, 2023

(87) PCT Pub. No.: WO2022/230081  
PCT Pub. Date: Nov. 3, 2022

(65) Prior Publication Data  
US 2024/0121508 A1 Apr. 11, 2024

(51) Int. Cl.  
*H04N 23/661* (2023.01)  
*G06V 10/82* (2022.01)

(52) U.S. Cl.  
CPC .......... *H04N 23/661* (2023.01); *G06V 10/82* (2022.01)

(58) Field of Classification Search  
CPC .... H04N 23/661; H04N 5/91; H04N 21/2343; H04N 21/438; H04N 21/4728; G06V 10/82; G06V 10/62; G06V 20/56  
See application file for complete search history.

(56) References Cited

U.S. PATENT DOCUMENTS 6,057,893 A 5/2000 Kojima et al.  
2022/0147851 A1* 5/2022 Yoshimura ............ G06N 20/00

FOREIGN PATENT DOCUMENTS

CN 118233603 A * 6/2024  
JP H09-238353 A 9/1997  
(Continued)

OTHER PUBLICATIONS

International Search Report and Written Opinion mailed on Jul. 27, 2021, received for PCT Application PCT/JP2021/016888, filed on Apr. 28, 2021, 9 pages including English Translation.  
(Continued)

*Primary Examiner* — Shahbaz Nazrul  
(74) *Attorney, Agent, or Firm* — XSENSUS LLP

(57) ABSTRACT

A video transmission system includes: a video data acquiring unit to acquire first video data indicating a first video photographed by a camera; a first inference unit to give the first video data to a first learning model, and acquire intermediate data that is data different from the first video data from the first learning model; a data transmission unit to transmit the intermediate data; a data reception unit to receive the intermediate data transmitted from the data transmission unit; and a second inference unit to give the intermediate data to a second learning model, and acquire, from the second learning model, second video data indicating a predicted video of a second video of which a photographing time of the camera is advanced from that of the first video by a transmission time of the intermediate data from the data transmission unit to the data reception unit or more.

8 Claims, 12 Drawing Sheets

(56) References Cited

FOREIGN PATENT DOCUMENTS

| JP | 2004-158929 A | 6/2004 |
|---|---|---|
| JP | 2019-029746 A | 2/2019 |

OTHER PUBLICATIONS

Villegas et al., "Learning to Generate Long-term Future via Hierarchical Prediction", arXiv:1704.05831v5 [cs.CV], Jan. 8, 2018, 21 pages.
Villegas et al., "High Fidelity Video Prediction with Large Stochastic Recurrent Neural Networks", arXiv:1911.01655v1 [cs.CV], Nov. 5, 2019, pp. 1-21.
Liu et al., "Unsupervised Image-to-Image Translation Networks", arXiv:1703.00848v6 [cs.CV], Jul. 23, 2018, pp. 1-11.
Zhou et al., "Unsupervised Learning of Depth and Ego-Motion from Video", CVPR 2017, 10 pages.
Wang et al., "Video-to-Video Synthesis", arXiv:1808.06601v2 [cs.CV], Dec. 3, 2018, pp. 1-14.

\* cited by examiner

VIDEO TRANSMISSION SYSTEM, VIDEO TRANSMISSION METHOD, AND VIDEO RECEPTION DEVICE

CROSS-REFERENCE TO RELATED APPLICATION

This application is based on PCT filing PCT/JP2021/016888, filed Apr. 28, 2021, the entire contents of which are incorporated herein by reference.

TECHNICAL FIELD

The present disclosure relates to a video transmission system, a video transmission method, and a video reception device.

BACKGROUND ART

A worker or the like in a remote place may give a work instruction to a site where a certain work is performed. For example, a worker or the like in a remote place may give a work instruction while viewing a video of the site displayed on a monitor and checking the situation of the site. The work instruction instructs a machine such as a robot, a car, or a camera present on the site to operate.

There is a video transmission system that transmits video data indicating a video of the site to a remote place.

Meanwhile, Patent Literature 1 discloses a technique for shortening a transmission time of video data from when the video data is transmitted from a transmission unit to when the video data is received by a reception unit. The transmission unit performs compression processing on the video data, and transmits the compressed video data to the reception unit.

CITATION LIST

Patent Literature

Patent Literature 1: JP 2019-29746 A

SUMMARY OF INVENTION

Technical Problem

In a video transmission system, it is impossible to make a transmission time of video data from a site to a remote place zero. If the transmission time of the video data is not zero, a delay occurs in checking of the situation on the site by a worker or the like in a remote place. If a delay occurs in the checking of the situation on the site, a work instruction by the worker or the like is also delayed, and thus there is a problem that the worker or the like may issue an inappropriate work instruction.

Even with the technique disclosed in Patent Literature 1, it is impossible to make the transmission time of the video data zero. Therefore, even if the technology can be applied to the video transmission system, the above problem cannot be solved.

The present disclosure has been made to solve the above problems, and an object of the present disclosure is to provide a video transmission system and a video transmission method capable of supporting a worker or the like in a remote place to issue an appropriate work instruction to the site.

Solution to Problem

A video transmission system according to the present disclosure includes: video data acquiring circuitry to acquire first video data indicating a first video photographed by a camera; first inference circuitry to give the first video data acquired by the video data acquiring circuitry to a first learning model, and acquire intermediate data that is data different from the first video data from the first learning model; data transmission circuitry to transmit the intermediate data acquired by the first inference circuitry; data reception circuitry to receive the intermediate data transmitted from the data transmission circuitry; and second inference circuitry to give the intermediate data received by the data reception circuitry to a second learning model, and acquire, from the second learning model, second video data indicating a predicted video of a second video of which a photographing time of the camera is advanced from that of the first video by a transmission time of the intermediate data from the data transmission circuitry to the data reception circuitry or more.

Advantageous Effects of Invention

According to the present disclosure, it is possible to support a worker or the like in a remote place to issue an appropriate work instruction to the site.

BRIEF DESCRIPTION OF DRAWINGS

FIG. 5 is a hardware configuration diagram of a computer in a case where the video transmission device 3 or the video reception device 5 is implemented by software, firmware, or the like.

DESCRIPTION OF EMBODIMENTS

In order to explain the present disclosure in more detail, a mode for carrying out the present disclosure will be described below with reference to the accompanying drawings.

First Embodiment

Figure 1:
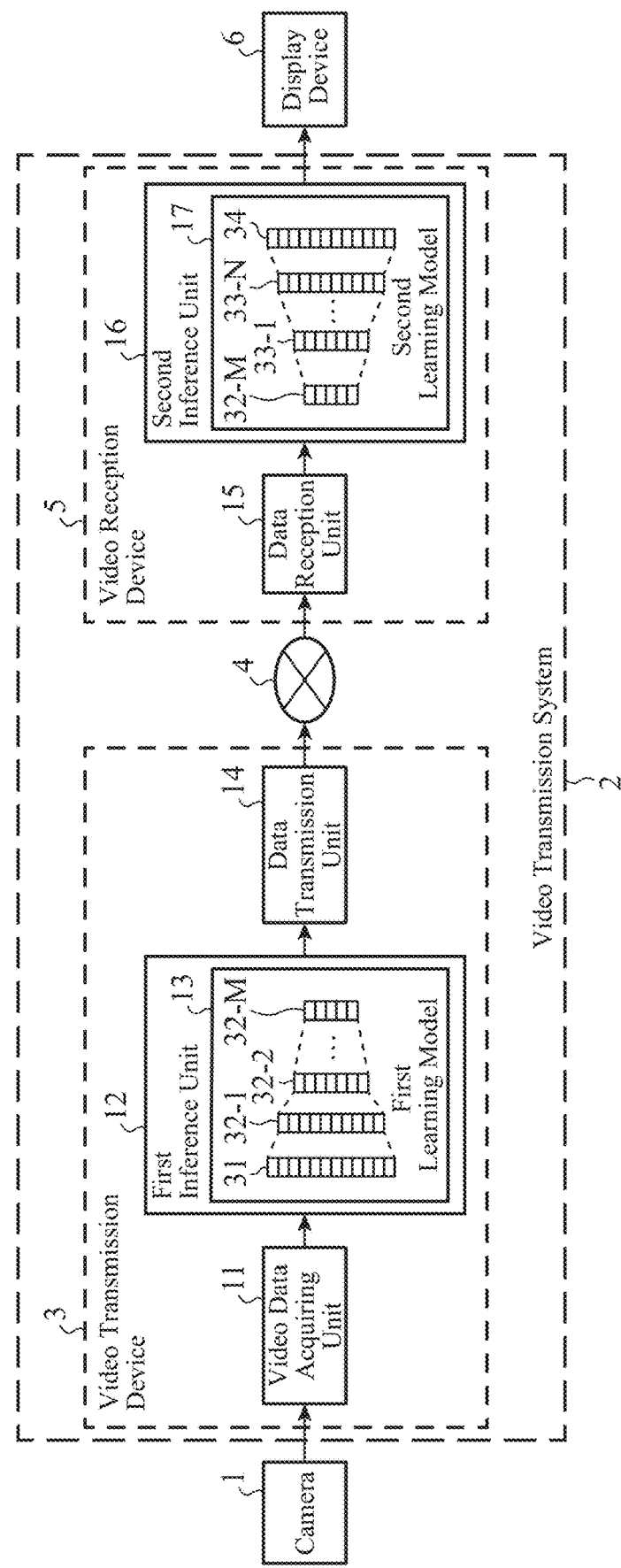
FIG. 1 is a configuration diagram illustrating a video transmission system 2 according to a first embodiment.

FIG. 1 is a configuration diagram illustrating a video transmission system 2 according to a first embodiment.

Figure 2:
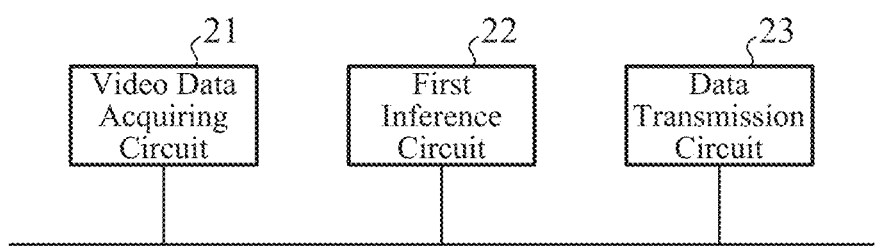
FIG. 2 is a hardware configuration diagram illustrating hardware of a video transmission device 3 included in the video transmission system 2 according to the first embodiment.

FIG. 2 is a hardware configuration diagram illustrating hardware of a video transmission device 3 included in the video transmission system 2 according to the first embodiment.

Figure 3:
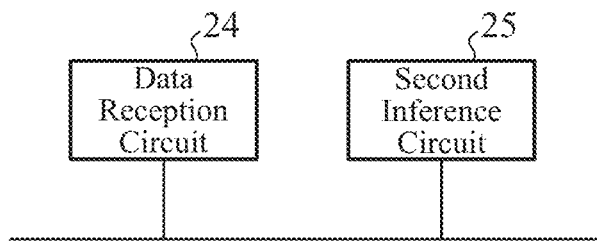
FIG. 3 is a hardware configuration diagram illustrating hardware of a video reception device 5 included in the video transmission system 2 according to the first embodiment.

FIG. 3 is a hardware configuration diagram illustrating hardware of a video reception device 5 included in the video transmission system 2 according to the first embodiment.

In FIG. 1, a camera 1 photographs a subject. The subject is an object to be photographed by the camera 1, and corresponds to a natural landscape, a flower, an insect, an animal, a person, a building, a road, an automobile, a train, an aircraft, or the like.

The camera 1 outputs first video data indicating a first video in which a subject appears to the video transmission system 2.

The video transmission system 2 includes a video transmission device 3, a transmission path 4, and a video reception device 5. The video transmission device 3 is on a video transmission side, and the video reception device 5 is on a video reception side.

The video transmission device 3 includes a video data acquiring unit 11, a first inference unit 12, and a data transmission unit 14.

The transmission path 4 is a wired transmission line or a wireless transmission line.

One end of the transmission path 4 is connected to the video transmission device 3, and the other end of the transmission path 4 is connected to the video reception device 5.

The video transmission system 2 illustrated in FIG. 1 includes the transmission path 4. However, this is merely an example, and the transmission path 4 may be provided outside the video transmission system 2, and the video transmission system 2 may include the video transmission device 3 and the video reception device 5.

The video reception device 5 includes a data reception unit 15 and a second inference unit 16.

The video data acquiring unit 11 is implemented by, for example, a video data acquiring circuit 21 illustrated in FIG. 2.

The video data acquiring unit 11 acquires the first video data output from the camera 1.

The video data acquiring unit 11 outputs the first video data to the first inference unit 12.

The first inference unit 12 is implemented by, for example, a first inference circuit 22 illustrated in FIG. 2.

The first inference unit 12 includes a first learning model 13.

The first inference unit 12 gives the first video data acquired by the video data acquiring unit 11 to the first learning model 13, and acquires intermediate data which is data different from the first video data, from the first learning model 13. The intermediate data is data in a middle stage until the first video data is converted into second video data to be described later in a learning model 30 illustrated in FIG. 4.

In the video transmission system 2 illustrated in FIG. 1, it is assumed that the data amount of the intermediate data is smaller than the data amount of the first video data. However, this is merely an example, and the data amount of the intermediate data is not limited to be smaller than the data amount of the first video data.

The first inference unit 12 outputs the intermediate data to the data transmission unit 14.

In the video transmission system 2 illustrated in FIG. 1, the first inference unit 12 includes the first learning model 13. However, this is merely an example, and the first learning model 13 may be provided outside the first inference unit 12.

Each of the first learning model 13 and a second learning model 17 to be described later is a part of the learning model 30 illustrated in FIG. 4.

Figure 4:
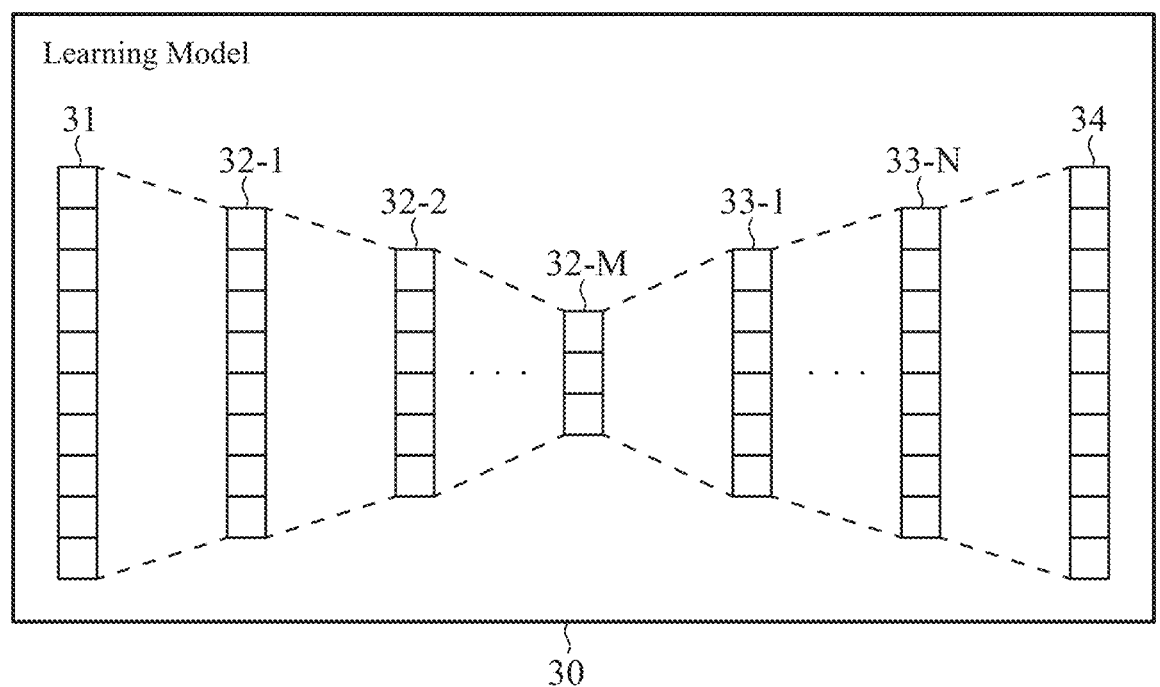
FIG. 4 is an explanatory diagram illustrating an example of a learning model 30.

FIG. 4 is an explanatory diagram illustrating an example of the learning model 30.

The learning model 30 is implemented by, for example, a neural network. The learning model 30 includes an input layer 31, M intermediate layers 32-1 to 32-M, N intermediate layers 33-1 to 33-N, and an output layer 34. Each of M and N is an integer of 2 or more.

The learning model 30 illustrated in FIG. 4 includes the M intermediate layers 32-1 to 32-M. However, this is merely an example, and the learning model 30 may include only the intermediate layer 32-1 among the M intermediate layers 32-1 to 32-M. In addition, the learning model 30 illustrated in FIG. 4 includes the N intermediate layers 33-1 to 33-N. However, this is merely an example, and the learning model 30 may include only the intermediate layer 33-1 among the N intermediate layers 33-1 to 33-N.

At the time of learning, the first video data acquired by the video data acquiring unit 11 is provided to the input layer 31 of the learning model 30. In addition, as teacher data, the predicted video of the second video of which the photographing time of the camera 1 is advanced from that of the first video by the transmission time of the intermediate data or more, is given to the learning model 30. The transmission time of the intermediate data is a time taken for the intermediate data to reach the data reception unit 15 from the data transmission unit 14. In the video transmission system 2 illustrated in FIG. 1, it is assumed that the transmission time of the intermediate data is fixed, and in the video transmission system 2, the transmission time of the intermediate data is an existing value.

If the processing time of each of the video data acquiring unit 11, the first inference unit 12, the data transmission unit 14, the data reception unit 15, and the second inference unit 16 is a negligibly short time, video data indicating the predicted video of the second video of which the photographing time of the camera 1 is advanced from that of the first video by the transmission time of the intermediate data is provided to the learning model 30, as the teacher data.

On the other hand, if each processing time is not a negligibly short time, the video data indicating the predicted video of the second video of which the photographing time of the camera 1 is advanced from that of the first video by the total time of each processing time and the transmission time of the intermediate data is provided to the learning model 30, as the teacher data.

The learning model 30 is learned in such a way that if each processing time is a negligibly short time, when the first video data is given to the input layer 31, the second video data indicating the predicted video of the second video of which the photographing time is advanced from that of the first video by the transmission time of the intermediate data is output from the output layer 34.

The learning model 30 is learned in such a way that if each processing time is not a negligibly short time, when the first video data is given to the input layer 31, the second video data indicating the predicted video of the second video of which the photographing time is advanced from that of the first video by the total time of each processing time and the transmission time of the intermediate data is output from the output layer 34.

The input layer 31 of the learning model 30 has, for example, the same number of input terminals as the number of a plurality of pixels constituting the first video. The first video data is data indicating pixel values of the respective pixels, and each of the pixel values is provided to a corresponding one of the input terminals in the input layer 31.

The output layer 34 of the learning model 30 has, for example, the same number of output terminals as the number of a plurality of pixels constituting the predicted video of the second video. The second video data is data indicating pixel values of the respective pixels, and each of the pixel values is output from a corresponding one of the output terminals in the output layer 34.

The first learning model 13 includes the input layer 31 and the M intermediate layers 32-1 to 32-M included in the learned learning model 30.

The second learning model 17 includes an intermediate layer 32-M, the N intermediate layers 33-1 to 33-N, and the output layer 34 included in the learned learning model 30.

Note that a technique of generating the first learning model 13 in such a way as to include the input layer 31 and the M intermediate layers 32-1 to 32-M, and a technique of generating the second learning model 17 in such a way as to include the intermediate layer 32-M, the N intermediate layers 33-1 to 33-N, and the output layer 34 are known techniques.

The data transmission unit 14 is implemented by, for example, a data transmission circuit 23 illustrated in FIG. 2.

The data transmission unit 14 transmits the intermediate data acquired by the first inference unit 12 to the data reception unit 15 via the transmission path 4.

The data reception unit 15 is implemented by, for example, a data reception circuit 24 illustrated in FIG. 3.

The data reception unit 15 receives the intermediate data transmitted from the data transmission unit 14.

The data reception unit 15 outputs the intermediate data to the second inference unit 16.

The second inference unit 16 is implemented by, for example, a second inference circuit 25 illustrated in FIG. 3.

The second inference unit 16 includes the second learning model 17.

The second inference unit 16 gives the intermediate data received by the data reception unit 15 to the second learning model 17, and acquires, from the second learning model 17, the second video data indicating the predicted video of the second video of which the photographing time of the camera 1 is advanced from that of the first video by the transmission time of the intermediate data or more.

In the video transmission system 2 illustrated in FIG. 1, for the sake of simplicity of explanation, it is assumed that each of the processing times in the video data acquiring unit 11, the first inference unit 12, the data transmission unit 14, the data reception unit 15, and the second inference unit 16 can be ignored. In this case, the second inference unit 16 gives the intermediate data received by the data reception unit 15 to the second learning model 17, and acquires, from the second learning model 17, the second video data indicating the predicted video of the second video of which the photographing time of the camera 1 is advanced from that of the first video by the transmission time of the intermediate data.

In a case where each processing time cannot be ignored, the second inference unit 16 gives the intermediate data received by the data reception unit 15 to the second learning model 17, and acquires, from the second learning model 17, the second video data indicating the predicted video of the second video of which the photographing time of the camera 1 is advanced that of from the first video by the total time of each processing time and the transmission time of the intermediate data.

The second inference unit 16 outputs the second video data to, for example, the display device 6 or a video processing device (not illustrated).

In the video transmission system 2 illustrated in FIG. 1, the second inference unit 16 includes the second learning model 17. However, this is merely an example, and the second learning model 17 may be provided outside the second inference unit 16.

The display device 6 causes the monitor to display the predicted video of the second video indicated by the second video data output from the second inference unit 16.

The video processing device (not illustrated) analyzes the subject or the like appearing in the predicted video of the second video on the basis of the second video data output from the second inference unit 16.

In FIG. 1, it is assumed that each of the video data acquiring unit 11, the first inference unit 12, and the data transmission unit 14 which are components of the video transmission device 3 is implemented by dedicated hardware as illustrated in FIG. 2. That is, it is assumed that the video transmission device 3 is implemented by the video data acquiring circuit 21, the first inference circuit 22, and the data transmission circuit 23.

Further, in FIG. 1, it is assumed that each of the data reception unit 15 and the second inference unit 16 which are components of the video reception device 5 is implemented by dedicated hardware as illustrated in FIG. 3. That is, it is assumed that the video reception device 5 is implemented by the data reception circuit 24 and the second inference circuit 25.

Each of the video data acquiring circuit 21, the first inference circuit 22, the data transmission circuit 23, the data reception circuit 24, and the second inference circuit 25 corresponds to, for example, a single circuit, a composite circuit, a programmed processor, a parallel-programmed processor, an application specific integrated circuit (ASIC), a field-programmable gate array (FPGA), or a combination thereof.

The components of the video transmission device 3 are not limited to those implemented by dedicated hardware, and the video transmission device 3 may be implemented by software, firmware, or a combination of software and firmware.

Furthermore, the components of the video reception device 5 are not limited to those implemented by dedicated hardware, and the video reception device 5 may be implemented by software, firmware, or a combination of software and firmware.

The software or firmware is stored in a memory of the computer, as a program. The computer means hardware that executes a program, and corresponds to, for example, a central processing unit (CPU), a central processing device, a processing device, an arithmetic device, a microprocessor, a microcomputer, a processor, or a digital signal processor (DSP).

Figure 5:
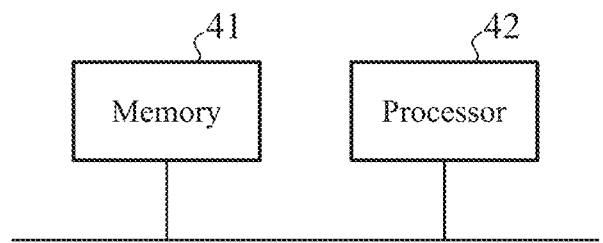

FIG. 5 is a hardware configuration diagram of a computer in a case where the video transmission device 3 or the video reception device 5 is implemented by software, firmware, or the like.

In a case where the video transmission device 3 is implemented by software, firmware, or the like, a program for causing a computer to execute each of processing procedures in the video data acquiring unit 11, the first inference unit 12, and the data transmission unit 14 is stored in a memory 41. Then, a processor 42 of the computer executes the program stored in the memory 41.

In a case where the video reception device 5 is implemented by software, firmware, or the like, a program for causing a computer to execute each of processing procedures in the data reception unit 15 and the second inference unit 16 is stored in the memory 41. Then, a processor 42 of the computer executes the program stored in the memory 41.

FIG. 2 illustrates an example in which each of the components of the video transmission device 3 is implemented by dedicated hardware, and FIG. 5 illustrates an example in which the video transmission device 3 is implemented by software, firmware, or the like. However, these are merely examples, and some components in the video transmission device 3 may be implemented by dedicated hardware, and the remaining components may be implemented by software, firmware, or the like.

FIG. 3 illustrates an example in which each of the components of the video reception device 5 is implemented by dedicated hardware, and FIG. 5 illustrates an example in which the video reception device 5 is implemented by software, firmware, or the like. However, these are merely examples, and some components in the video reception device 5 may be implemented by dedicated hardware, and the remaining components may be implemented by software, firmware, or the like.

Next, an operation of the video transmission system 2 illustrated in FIG. 1 will be described.

Figure 6:
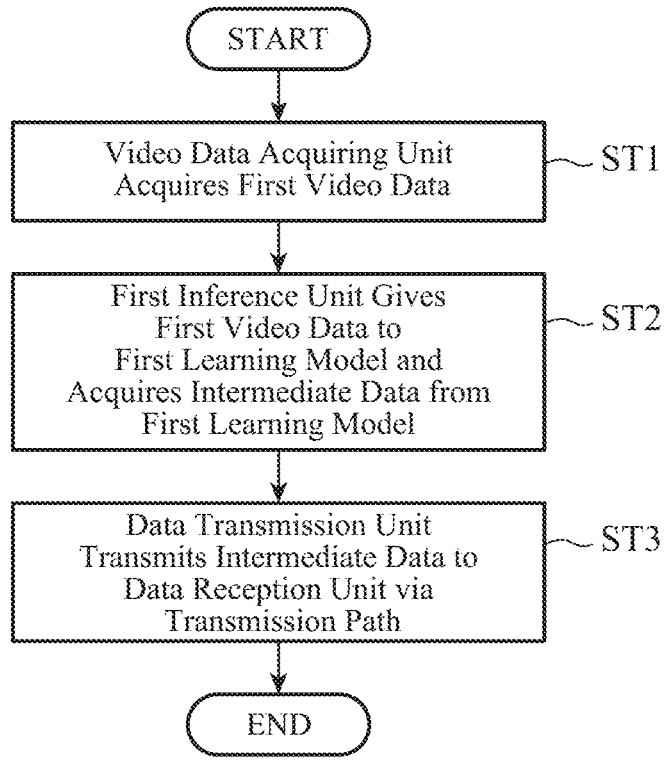
FIG. 6 is a flowchart illustrating a processing procedure of the video transmission device 3 which is a part of a video transmission method.

FIG. 6 is a flowchart illustrating a processing procedure in the video transmission device 3 which is a part of the video transmission method.

Figure 7:
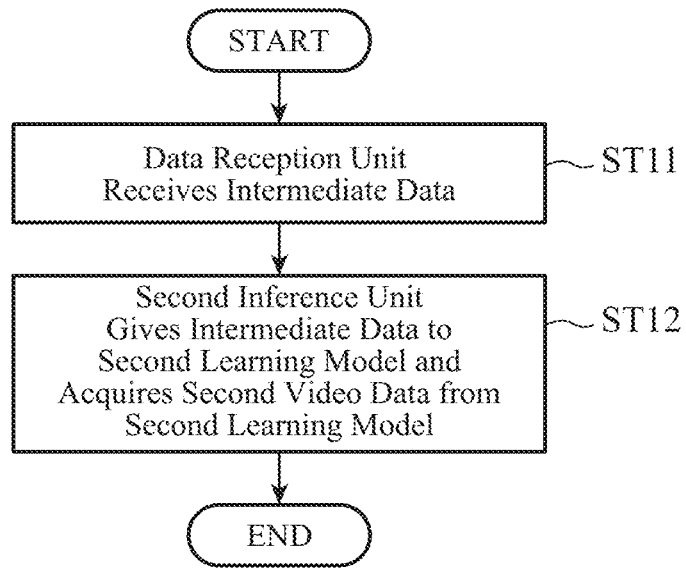
FIG. 7 is a flowchart illustrating a processing procedure of the video reception device 5 which is a part of the video transmission method.

FIG. 7 is a flowchart illustrating a processing procedure in the video reception device 5 which is a part of the video transmission method.

In the learning model 30 illustrated in FIG. 4, at the time of learning, in addition to the first video data acquired by the video data acquiring unit 11, video data indicating the predicted video of the second video of which the photographing time of the camera 1 is advanced from that of the first video by the transmission time of the intermediate data is given to the learning model 30, as teacher data.

Then, by using an image sequence for the first video indicated by each of a plurality of pieces of the first video data and an image sequence for the predicted video indicated by each of a plurality of pieces of the teacher data, the learning model 30 is learned in such a way as to obtain a future video for a certain video as a predicted video when the certain video is given. That is, the learning model 30 is learned in such a way that, when the first video data is given to the input layer 31, the video data indicating the predicted video of the second video of which the photographing time of the camera 1 is advanced from that of the first video by the transmission time of the intermediate data is output from the output layer 34.

Figure 8:
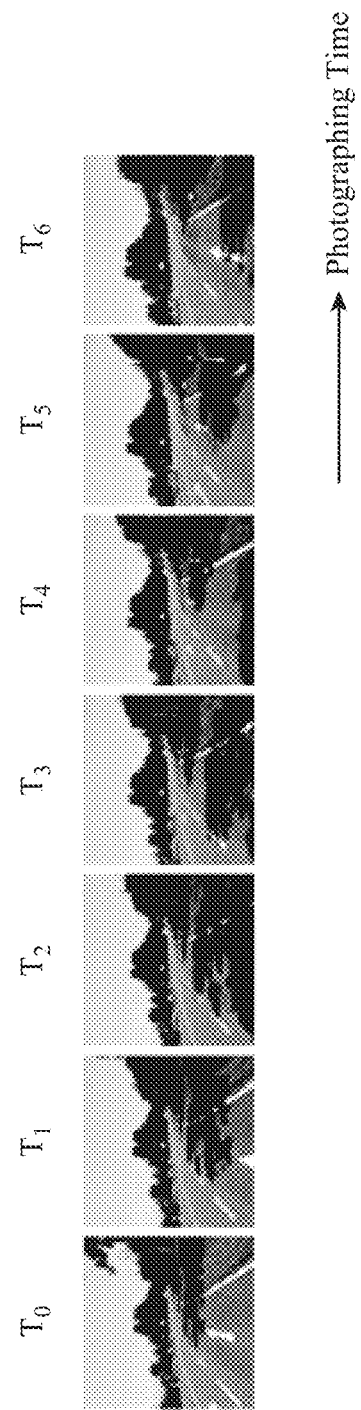
FIG. 8 is an explanatory diagram illustrating a plurality of videos photographed at different times by a camera 1.

FIG. 8 is an explanatory diagram illustrating a plurality of videos photographed at different times by the camera 1.

In FIGS. 8, $T_0$ to $T_6$ are video photographing times. The photographing time $T_0$ is the oldest photographing time among the photographing times $T_0$ to $T_6$, and the photographing time $T_6$ is the latest photographing time among the photographing times $T_0$ to $T_6$.

A time difference $\Delta T$ between the individual photographing times $T_0$ to $T_6$ is expressed by the following formula (1).

$$\Delta T = T_1 - T_0 = T_2 - T_1 = T_3 - T_2 = T_4 - T_3 = T_5 - T_4 = T_6 - T_5 \tag{1}$$

For example, it is learned in such a way that in a case that the transmission time of the intermediate data is equal to the time $3 \times \Delta T$ between the photographing time $T_3$ and the photographing time $T_0$, when the first video data indicating the first video at the photographing time $T_0$ is supplied to the input layer 31, the second video data indicating the video at the photographing time $T_3$ ($= T_0 + 3 \times \Delta T$) is output from the output layer 32, as the predicted video of the second video. Further, it is learned in such a way that when the first video data indicating the first video at the photographing time $T_1$ is provided to the input layer 31, the second video data indicating the video at the photographing time $T_4$ ($= T_1 + 3 \times \Delta T$) is output from the output layer 34, as the predicted video of the second video.

The learned learning model 30 includes the input layer 31, the M intermediate layers 32-1 to 32-M, the N intermediate layers 33-1 to 33-N, and the output layer 34.

Each of the first learning model 13 and the second learning model 17 is generated by dividing the learned learning model 30 in such a way that each of the first learning model 13 and the second learning model 17 includes the intermediate layer 32-M in common.

That is, the first learning model 13 is generated in such a way as to include the input layer 31 and the M intermediate layers 32-1 to 32-M, and the second learning model 17 is generated in such a way as to include the intermediate layer 32-M, the N intermediate layers 33-1 to 33-N, and the output layer 34.

The camera 1 outputs the first video data indicating the first video to the video data acquiring unit 11 of the video transmission system 2.

The video data acquiring unit 11 acquires the first video data output from the camera 1 (step ST1 in FIG. 6).

The video data acquiring unit 11 outputs the first video data to the first inference unit 12.

The first inference unit 12 acquires the first video data from the video data acquiring unit 11.

The first inference unit 12 gives the first video data to the first learning model 13, and acquires the intermediate data which is data different from the first video data from the first learning model 13 (step ST2 in FIG. 6).

That is, the first inference unit 12 gives the first video data to the input layer 31 and acquires the intermediate data from the intermediate layer 32-M.

The first inference unit 12 outputs the intermediate data to the data transmission unit 14.

Because a program for executing the general compression processing on the video data has a syntax for executing a branch, a processing time of the compression processing may vary. The first inference unit 12 acquires intermediate data by providing the first video data to the first learning model 13, and is not a program that executes a syntax for executing a branch. Therefore, the processing time of the first inference unit 12 does not cause variation in the processing time as in the general compression processing.

Note that, in the video transmission system 2 illustrated in FIG. 1, as described above, the processing time of the first inference unit 12 is ignored in order to simplify the description.

The data transmission unit 14 acquires the intermediate data from the first inference unit 12.

The data transmission unit 14 transmits the intermediate data to the data reception unit 15 via the transmission path 4 (step ST3 in FIG. 6).

The data reception unit 15 receives the intermediate data transmitted from the data transmission unit 14 (step ST11 in FIG. 7).

The data reception unit 15 outputs the intermediate data to the second inference unit 16.

The second inference unit 16 acquires the intermediate data from the data reception unit 15.

The second inference unit 16 gives the intermediate data to the second learning model 17 and acquires the second video data from the second learning model 17 (step ST12 in FIG. 7).

That is, the second inference unit 16 gives the intermediate data to the intermediate layer 32-M and acquires the second video data from the output layer 34.

It is assumed that the transmission time of the intermediate data is, for example, a time equal to the time $3 \times \Delta T$ between the photographing time $T_3$ and the photographing time $T_0$. In this case, for example, when the first video data indicating the first video at the photographing time $T_0$ is provided to the input layer 31 of the first learning model 13, the second video data indicating the video at the photographing time $T_3$ $(=T_0+3 \times \Delta T)$ is output from the output layer 34 of the second learning model 17, as the predicted video of the second video.

For example, when the first video data indicating the first video at the photographing time $T_2$ is provided to the input layer 31 of the first learning model 13, the second video data indicating the video at the photographing time $T_5$ $(=T_2+3 \times \Delta T)$ is output from the output layer 34 of the second learning model 17, as the predicted video of the second video.

Therefore, the video indicated by the second video data output from the output layer 34 of the second learning model 17 is a predicted video of the second video of which the photographing time of the camera 1 is advanced from that of the first video, that is, a video obtained by predicting a real-time photographed video by the camera 1.

The second inference unit 16 outputs the second video data to, for example, the display device 6 or the video processing device (not illustrated).

The display device 6 causes the monitor to display the predicted video indicated by the second video data output from the second inference unit 16.

A worker or the like in a remote place can check the situation at the site, by viewing the predicted video displayed on the monitor.

In the first embodiment described above, the video transmission system 2 is configured to include: the video data acquiring unit 11 to acquire first video data indicating a first video; the first inference unit 12 to give the first video data acquired by the video data acquiring unit 11 to the first learning model 13 and acquire intermediate data that is data different from the first video data from the first learning model 13; the data transmission unit 14 to transmit the intermediate data acquired by the first inference unit 12; the data reception unit 15 to receive the intermediate data transmitted from the data transmission unit 14; and the second inference unit 16 to give the intermediate data received by the data reception unit 15 to the second learning model 17, and acquire, from the second learning model 17, second video data indicating a predicted video of a second video of which a photographing time of the camera 1 is advanced from that of the first video by a transmission time of the intermediate data from the data transmission unit 14 to the data reception unit 15 or more. Therefore, the video transmission system 2 can support a worker or the like in a remote place to issue an appropriate work instruction to the site.

In the video transmission system 2 illustrated in FIG. 1, the learned learning model 30 is implemented by a learned neural network. However, the learned learning model 30 is not limited to one implemented by a learned neural network, and may be implemented by, for example, learned deep learning. Therefore, each of the first learning model 13 and the second learning model 17 may be implemented by, for example, a part of learned deep learning.

Second Embodiment

In a second embodiment, a video transmission system 2 including a transmission time specifying unit 18 that specifies a transmission time of intermediate data from a data transmission unit 14 to a data reception unit 15 will be described.

In the video transmission system 2 illustrated in FIG. 1, it is assumed that the transmission time of the intermediate data is fixed and is an existing value.

Figure 9:
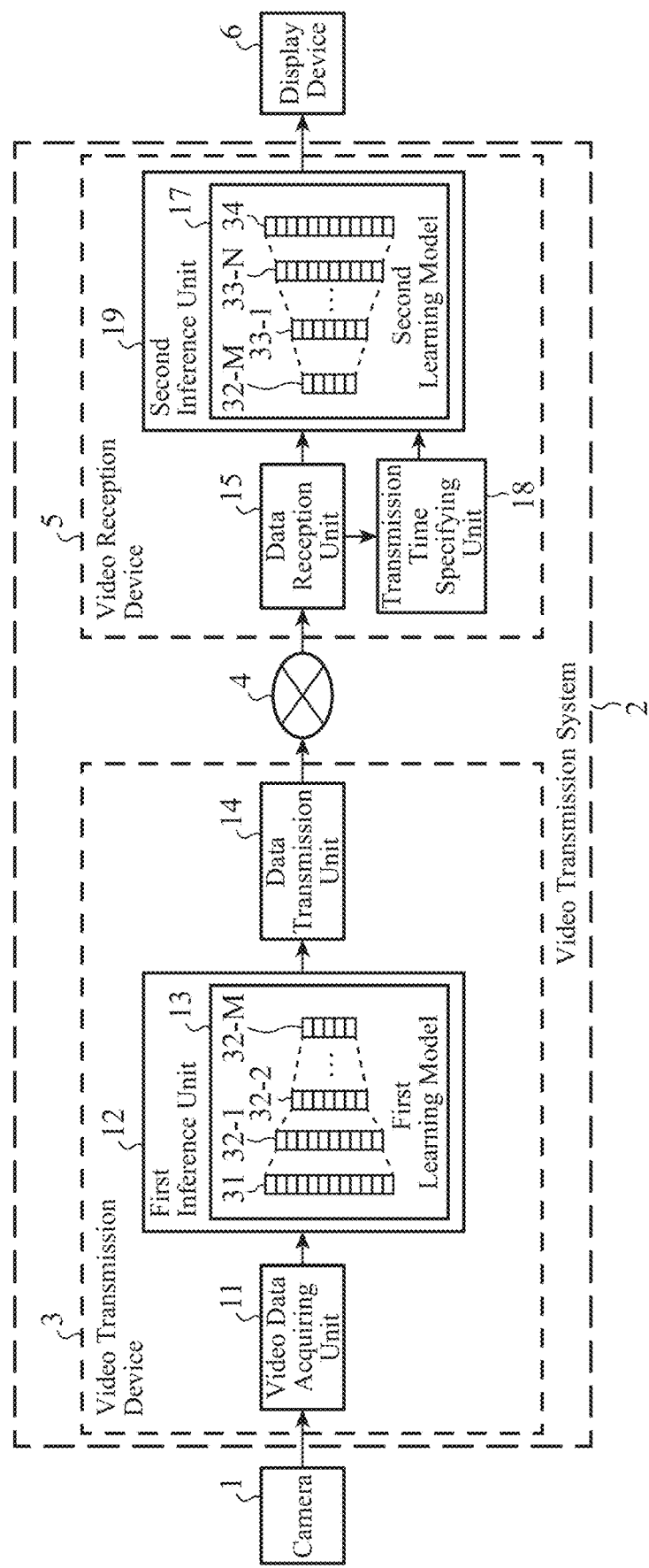
FIG. 9 is a configuration diagram illustrating a video transmission system 2 according to a second embodiment.

In the video transmission system 2 illustrated in FIG. 9, it is assumed that the transmission time of the intermediate data varies and is not an existing value.

FIG. 9 is a configuration diagram illustrating the video transmission system 2 according to the second embodiment.

Figure 10:
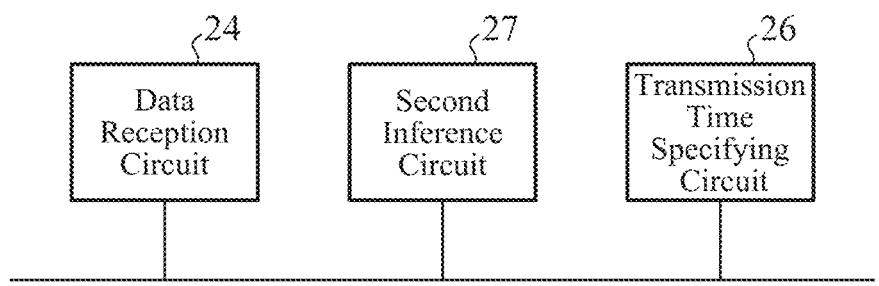
FIG. 10 is a hardware configuration diagram illustrating hardware of a video reception device 5 included in the video transmission system 2 according to the second embodiment.

FIG. 10 is a hardware configuration diagram illustrating hardware of a video reception device 5 included in the video transmission system 2 according to the second embodiment.

In FIGS. 9 and 10, the same reference numerals as those in FIGS. 1 and 3 denote the same or corresponding parts, and thus description thereof is omitted.

The hardware of a video transmission device 3 included in the video transmission system 2 illustrated in FIG. 9 is similar to the hardware of the video transmission device 3 included in the video transmission system 2 illustrated in FIG. 1. Therefore, a hardware configuration diagram of the video transmission device 3 included in the video transmission system 2 illustrated in FIG. 9 is FIG. 2.

The transmission time specifying unit 18 is implemented by, for example, a transmission time specifying circuit 26 illustrated in FIG. 10.

The transmission time specifying unit 18 specifies a transmission time Time of the intermediate data from the transmitting time of the intermediate data by the data transmission unit 14 and the receiving time of the intermediate data by the data reception unit 15.

For example, the video transmission device 3 and the video reception device 5 are time-synchronized, and a time stamp indicating the time when the first video data is acquired by the video data acquiring unit 11 is added to the intermediate data transmitted from the data transmission unit 14. The transmission time specifying unit 18 calculates a difference between a receiving time Tr of the intermediate data by the data reception unit 15 and a time Ts indicated by the time stamp, as the transmission time Time.

The transmission time specifying unit 18 outputs the transmission time Time to the second inference unit 19.

The second inference unit 19 is implemented by, for example, the second inference circuit 27 illustrated in FIG. 10.

The second inference unit 19 includes a second learning model 17.

The second inference unit 19 acquires, from the second learning model 17, the second video data indicating the predicted video of the second video of which the photographing time of the camera 1 is advanced from that of the first video by the transmission time Time specified by the transmission time specifying unit 18 or more.

In the video transmission system 2 illustrated in FIG. 9, for the sake of simplicity of explanation, it is assumed that each of the processing times in the video data acquiring unit 11, the first inference unit 12, the data transmission unit 14, the data reception unit 15, and the second inference unit 19 can be ignored. In this case, the second inference unit 19 gives the intermediate data received by the data reception unit 15 to the second learning model 17, and acquires, from the second learning model 17, the second video data indicating the predicted video of the second video of which the photographing time of the camera 1 is advanced from that of the first video by the transmission time Time specified by the transmission time specifying unit 18.

In a case where each processing time cannot be ignored, the second inference unit 19 gives the intermediate data received by the data reception unit 15 to the second learning model 17, and acquires, from the second learning model 17, the second video data indicating the predicted video of the second video of which the photographing time of the camera 1 is advanced from that of the first video by the total time of each processing time and the transmission time Time of the intermediate data.

The second inference unit 19 outputs the second video data to, for example, a display device 6 or a video processing device (not illustrated).

In FIG. 9, it is assumed that each of the data reception unit 15, the transmission time specifying unit 18, and the second inference unit 19 which are components of the video reception device 5 is implemented by dedicated hardware as illustrated in FIG. 10. That is, it is assumed that the video reception device 5 is implemented by the data reception circuit 24, the transmission time specifying circuit 26, and the second inference circuit 27.

Each of the data reception circuit 24, the transmission time specifying circuit 26, and the second inference circuit 27 corresponds to, for example, a single circuit, a composite circuit, a programmed processor, a parallel-programmed processor, ASIC, FPGA, or a combination thereof.

The components of video reception device 5 are not limited to those implemented by dedicated hardware, and the video reception device 5 may be implemented by software, firmware, or a combination of software and firmware.

In a case where the video reception device 5 is implemented by software, firmware, or the like, a program for causing a computer to execute each of processing procedures in the data reception unit 15, the transmission time specifying unit 18, and the second inference unit 19 is stored in the memory 41 illustrated in FIG. 5. Then, the processor 42 illustrated in FIG. 5 executes the program stored in the memory 41.

FIG. 10 illustrates an example in which each of the components of the video reception device 5 is implemented by dedicated hardware, and FIG. 5 illustrates an example in which the video reception device 5 is implemented by software, firmware, or the like. However, these are merely examples, and some components in the video reception device 5 may be implemented by dedicated hardware, and the remaining components may be implemented by software, firmware, or the like.

Next, an operation of the video transmission system 2 illustrated in FIG. 9 will be described.

In the video transmission system 2 illustrated in FIG. 9, at the time of learning, in addition to the first video data acquired by the video data acquiring unit 11, video data indicating a video of which the photographing time of the camera 1 is advanced from that of the first video by an assumed maximum transmission time $Time_{max}$ is provided to the learning model 30, as teacher data. Then, the learning model 30 is learned in such a way that when the first video data is given to the input layer 31, the second video data indicating a video of which the photographing time is advanced from that of the first video by the maximum transmission time $Time_{max}$ is output from the output layer 34.

The video transmission device 3 illustrated in FIG. 9 operates similarly to the video transmission device 3 illustrated in FIG. 1.

However, the data transmission unit 14 of the video transmission device 3 illustrated in FIG. 9 adds the time stamp indicating time Ts at which the first video data is acquired by the video data acquiring unit 11 to the intermediate data, and transmits the intermediate data with the time stamp to the video reception device 5 via the transmission path 4.

The video reception device 5 illustrated in FIG. 9 performs the following preprocessing before the second inference unit 19 starts processing of acquiring the second video data from the second learning model 17 and outputting the second video data to the display device 6 or the like.

Hereinafter, preprocessing by the video reception device 5 will be specifically described.

The data reception unit 15 receives the intermediate data with time stamp transmitted from the data transmission unit 14.

The data reception unit 15 outputs the intermediate data to the second inference unit 19.

The second inference unit 19 acquires the intermediate data from the data reception unit 15.

The second inference unit 19 gives the intermediate data to the second learning model 17, and acquires, from the second learning model 17, the second video data indicating the video of which the photographing time of the camera 1 is advanced from that of the first video by the maximum transmission time $Time_{max}$.

The second inference unit 19 stores the acquired second video data in the internal memory.

Here, for convenience of description, it is assumed that the maximum transmission time $Time_{max}$ is equal to the time $9 \times \Delta T$ between the photographing time $T_9$ and the photographing time $T_0$.

In this case, for example, when giving the intermediate data related to the first video at the photographing time $T_0$ to the second learning model 17, the second inference unit 19 acquires the second video data indicating the video at the photographing time $T_9$ ($=T_0+9\times\Delta T$) from the second learning model 17, and stores the second video data in the internal memory.

For example, when giving the intermediate data related to the first video at the photographing time $T_1$ to the second learning model 17, the second inference unit 19 acquires the second video data indicating the video at the photographing time $T_{10}$ (=$T_1$+9×$\Delta T$) from the second learning model 17, and stores the second video data in the internal memory.

For example, when giving the intermediate data related to the first video at the photographing time $T_2$ to the second learning model 17, the second inference unit 19 acquires the second video data indicating the video at the photographing time $T_{11}$ (=$T_2$+9×$\Delta T$) from the second learning model 17, and stores the second video data in the internal memory.

For example, when giving the intermediate data related to the first video at the photographing time $T_8$ to the second learning model 17, the second inference unit 19 acquires the second video data indicating the video at the photographing time $T_{17}$ (=$T_8$+9×$\Delta T$) from the second learning model 17, and stores the second video data in the internal memory.

As a result, nine pieces of second video data are stored in the internal memory of the second inference unit 19, and the preprocessing by the video reception device 5 ends. That is, the second video data indicating each of the video at the photographing time $T_9$, the video at the photographing time $T_{10}$, the video at the photographing time $T_{11}$, . . . , and the video at the photographing time $T_{17}$ is stored in the internal memory, and the preprocessing by the video reception device 5 ends.

Next, the video reception device 5 after completion of the preprocessing will be described.

The data reception unit 15 receives the intermediate data with time stamp transmitted from the data transmission unit 14.

The data reception unit 15 outputs the intermediate data with time stamp to the second inference unit 19.

In addition, the data reception unit 15 outputs each of the time stamp added to the intermediate data and the time information indicating the receiving time Tr of the intermediate data to the transmission time specifying unit 18.

The transmission time specifying unit 18 acquires each of the time stamp and the time information indicating the receiving time Tr from the data reception unit 15.

As expressed by the following formula (2), the transmission time specifying unit 18 calculates a difference between the receiving time Tr of the intermediate data by the data reception unit 15 and the time Ts indicated by the time stamp, as the transmission time Time of the intermediate data.

$$\text{Time}=Tr-Ts \qquad (2)$$

The transmission time specifying unit 18 outputs time information indicating the transmission time Time to the second inference unit 19.

The second inference unit 19 acquires intermediate data with time stamp from the data reception unit 15.

In addition, the second inference unit 19 acquires the time information indicating the transmission time Time from the transmission time specifying unit 18.

The second inference unit 19 adds the transmission time Time to the time Ts indicated by the time stamp added to the intermediate data.

The second inference unit 19 acquires, from among the nine pieces of second video data stored in the internal memory, the second video data indicating the video of which the photographing time of the camera 1 is advanced from that of the first video by the transmission time Time, as the predicted video of the second video.

For example, when the transmission time Time is equal to the time $\Delta T$ between the photographing time $T_1$ and the photographing time $T_0$, and the time Ts indicated by the time stamp is the photographing time $T_9$, the second inference unit 19 acquires the second video data indicating the video at the photographing time $T_{10}$ (=$T_9$+$\Delta T$), as the predicted video of the second video, from among the nine pieces of second video data stored in the internal memory.

For example, when the transmission time Time is equal to the time 2×$\Delta T$ between the photographing time $T_2$ and the photographing time $T_0$, and the time Ts indicated by the time stamp is the photographing time $T_9$, the second inference unit 19 acquires the second video data indicating the video at the photographing time $T_{11}$ (=$T_9$+2×$\Delta T$), as the predicted video of the second video, from among the nine pieces of second video data stored in the internal memory.

For example, when the transmission time Time is equal to the time 3×$\Delta T$ between the photographing time $T_3$ and the photographing time $T_0$, and the time Ts indicated by the time stamp is the photographing time $T_9$, the second inference unit 19 acquires the second video data indicating the video at the photographing time $T_{12}$ (=$T_9$+3×$\Delta T$), as the predicted video of the second video, from among the nine pieces of second video data stored in the internal memory.

The second inference unit 19 outputs the acquired second video data to, for example, the display device 6 or the video processing device (not illustrated).

In addition, the second inference unit 19 updates the second video data stored in the internal memory.

That is, the second inference unit 19 gives the intermediate data output from the data reception unit 15 to the second learning model 17, and acquires, from the second learning model 17, the second video data indicating a video of which the photographing time of the camera 1 is advanced from that of the first video by the maximum transmission time $\text{Time}_{max}$.

For example, if the maximum transmission time $\text{Time}_{max}$ is a time equal to the time 9×$\Delta T$ between the photographing time $T_9$ and the photographing time $T_0$, and the time Ts indicated by the time stamp is the photographing time $T_9$, the second inference unit 19 acquires, from the second learning model 17, the second video data indicating the video at the photographing time $T_{18}$ (=$T_9$+9×$\Delta T$).

The second inference unit 19 stores the second video data indicating the video at the photographing time $T_{18}$ (=$T_9$+9×$\Delta T$) in the internal memory.

In addition, the second inference unit 19 discards the second video data indicating the video with the oldest photographing time $T_9$ among the pieces of second video data stored in the internal memory.

In the second embodiment described above, the video transmission system 2 is configured in such a way as to include the transmission time specifying unit 18 to specify the transmission time of the intermediate data from the transmitting time of the intermediate data by the data transmission unit 14 and the receiving time of the intermediate data by the data reception unit 15, in which the second inference unit 19 acquires, from the second learning model 17, the second video data indicating the predicted video of the second video of which the photographing time of the camera 1 is advanced from that of the first video by the transmission time specified by the transmission time specifying unit 18 or more. Therefore, even when the transmission time of the intermediate data varies, the video transmission system 2 can support a worker or the like in a remote place to issue an appropriate work instruction to the site.

Third Embodiment

In a third embodiment, a video transmission system 2 in which a second inference unit 51 gives intermediate data received by a data reception unit 15 to one second learning model 17-*g* (g=1, . . . , G) of a plurality of second learning models 17-1 to 17-G, and acquires second video data from the one second learning model 17-*g* will be described. G is an integer of 2 or more.

Figure 11:
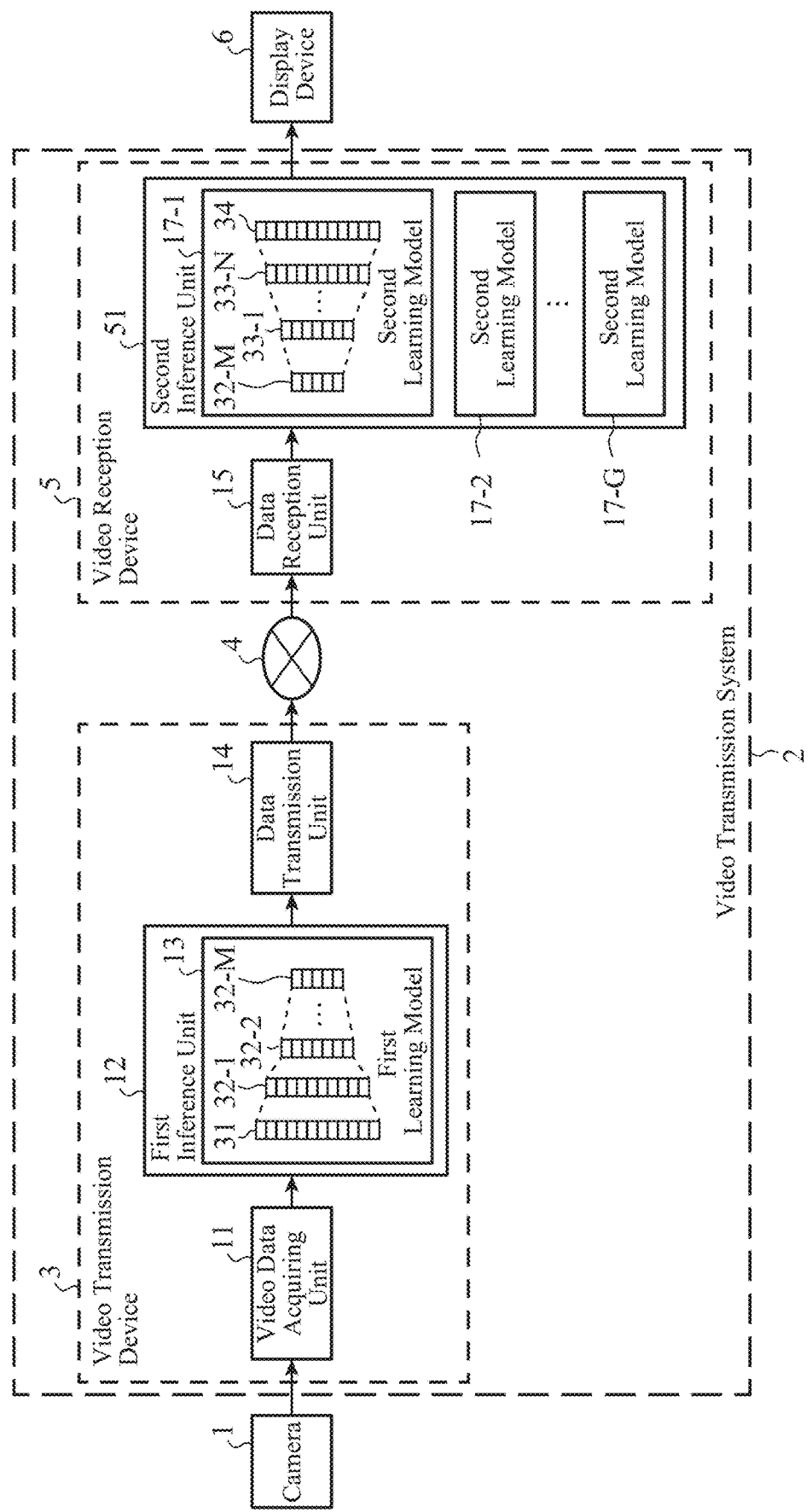
FIG. 11 is a configuration diagram illustrating a video transmission system 2 according to a third embodiment.

FIG. 11 is a configuration diagram illustrating the video transmission system 2 according to the third embodiment.

In FIG. 11, the same reference numerals as those in FIGS. 1 and 9 denote the same or corresponding parts, and thus description thereof is omitted.

Figure 12:
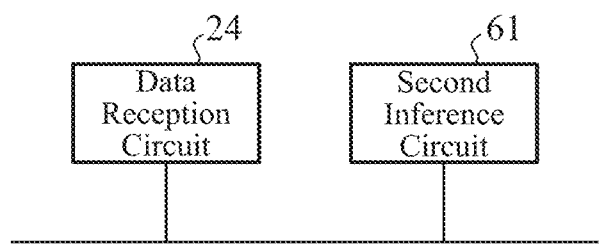
FIG. 12 is a hardware configuration diagram illustrating hardware of a video reception device 5 included in the video transmission system 2 according to the third embodiment.

FIG. 12 is a hardware configuration diagram illustrating hardware of the video reception device 5 included in the video transmission system 2 according to the third embodiment.

In FIG. 12, the same reference numerals as those in FIGS. 3 and 10 denote the same or corresponding parts, and thus description thereof is omitted.

The hardware of a video transmission device 3 included in the video transmission system 2 illustrated in FIG. 11 is similar to the hardware of the video transmission device 3 included in the video transmission system 2 illustrated in FIG. 1 or the video transmission device 3 included in the video transmission system 2 illustrated in FIG. 9. Therefore, a hardware configuration diagram of the video transmission device 3 included in the video transmission system 2 illustrated in FIG. 11 is FIG. 2.

The second inference unit 51 is implemented by, for example, a second inference circuit 61 illustrated in FIG. 12.

The second inference unit 51 includes the second learning models 17-1 to 17-G.

The second inference unit 51 gives the intermediate data received by the data reception unit 15 to one second learning model 17-*g* (g=1, . . . , G) of the plurality of second learning models 17-1 to 17-G, and acquires the second video data from the one second learning model 17-*g*.

The second inference unit 51 outputs the acquired second video data to, for example, a display device 6 or a video processing device (not illustrated).

In the video transmission system 2 illustrated in FIG. 11, an example in which the second inference unit 51 is used in the video transmission system 2 illustrated in FIG. 1 is illustrated. However, this is merely an example, and the second inference unit 51 may be used in the video transmission system 2 illustrated in FIG. 9.

The second learning model 17-1 is the same learning model as the second learning model 17 illustrated in FIG. 1.

Similarly to the second learning model 17-1, the second learning model 17-*g* (g=2, . . . , G) includes an intermediate layer 32-M, N intermediate layers 33-1 to 33-N, and an output layer 34.

However, the second learning model 17-*g* (g=2, . . . , G) is different from the second learning model 17-1, and is relearned by being further given the intermediate data received by the data reception unit 15 and teacher data.

A subject appearing in a video at the photographing time $T_j$ indicated by the teacher data given to the second learning model 17-*g* (g=2, . . . , G) and a subject appearing in a video at the photographing time $T_j$ indicated by teacher data given to the learning model 30 are the same subject. j=1, J, and J is an integer of 2 or more.

However, the video indicated by the teacher data given to the second learning model 17-*g* is, for example, a processed video of the video indicated by the teacher data given to the learning model 30.

For example, the video indicated by the teacher data given to the second learning model 17-2 is processed in such a way that the video indicated by the teacher data given to the learning model 30 is a video photographed in a daytime (hereinafter referred to as "daytime video").

For example, the video indicated by the teacher data given to the second learning model 17-3 is processed in such a way that the video indicated by the teacher data given to the learning model 30 is a video photographed in good weather (hereinafter referred to as "good-weather video").

For example, the video indicated by the teacher data given to the second learning model 17-4 is processed in such a way that the video indicated by the teacher data given to the learning model 30 is a video photographed in the summer season (hereinafter referred to as "summer video").

The daytime video is generally clearer than a video photographed during the nighttime. The good-weather video is generally clearer than a video photographed in cloudy weather or a video photographed in rainy weather. The summer video is generally clearer than a video photographed in a season other than summer.

In a case where the video photographed by the camera 1 is a video photographed in a day time, photographed in good weather, and photographed in the summer season, the video photographed by the camera 1 is generally clearer than each of the processed daytime video, the processed good-weather video, and the processed summer video.

In FIG. 11, it is assumed that each of the data reception unit 15 and the second inference unit 51 which are components of the video reception device 5 is implemented by dedicated hardware as illustrated in FIG. 12. That is, it is assumed that the video reception device 5 is implemented by the data reception circuit 24 and the second inference circuit 61.

Each of the data reception circuit 24 and the second inference circuit 61 corresponds to, for example, a single circuit, a composite circuit, a programmed processor, a parallel programmed processor, ASIC, FPGA, or a combination thereof.

The components of video reception device 5 are not limited to those implemented by dedicated hardware, and the video reception device 5 may be implemented by software, firmware, or a combination of software and firmware.

In a case where the video reception device 5 is implemented by software, firmware, or the like, a program for causing a computer to execute each of processing procedures in the data reception unit 15 and the second inference unit 51 is stored in the memory 41 illustrated in FIG. 5. Then, the processor 42 illustrated in FIG. 5 executes the program stored in the memory 41.

FIG. 12 illustrates an example in which each of the components of the video reception device 5 is implemented by dedicated hardware, and FIG. 5 illustrates an example in which the video reception device 5 is implemented by software, firmware, or the like. However, these are merely examples, and some components in the video reception device 5 may be implemented by dedicated hardware, and the remaining components may be implemented by software, firmware, or the like.

Next, an operation of the video transmission system 2 illustrated in FIG. 11 will be described.

In the video transmission system 2 illustrated in FIG. 11, an example in which G=4 will be described for convenience of description. However, it is not limited to G=4, and G=2, G=3, or G≥5 may be used.

In addition, in the video transmission system 2 illustrated in FIG. 11, it is assumed that the second learning models 17-1 to 17-4 have priorities. Here, for convenience of description, it is assumed that the second learning model 17-1 has the highest priority, the second learning model 17-2 has the second highest priority, the second learning model 17-3 has the third highest priority, and the second learning model 17-4 has the lowest priority.

The video transmission device 3 illustrated in FIG. 11 operates similarly to the video transmission device 3 illustrated in FIG. 1.

The data reception unit 15 of the video reception device 5 receives the intermediate data transmitted from the data transmission unit 14.

The data reception unit 15 outputs the intermediate data to the second inference unit 51.

The second inference unit 51 acquires the intermediate data from the data reception unit 15.

The second inference unit 51 gives the intermediate data to the second learning model 17-1, when the receiving time Tr of the intermediate data by the data reception unit 15 is included in the daytime period and the first video is photographed in good weather and photographed in the summer season. Then, the second inference unit 51 acquires the second video data indicating the predicted video of the second video from the second learning model 17-1.

Information indicating whether or not the first video is a video photographed in good weather may be given from the outside of the video transmission system 2 or may be added to the intermediate data. Information indicating whether or not the first video is a video photographed in the summer season may be given from the outside of the video transmission system 2 or may be added to the intermediate data. Furthermore, the information indicating whether or not the video is a video photographed in the summer season can also be obtained from a calendar included in the video reception device 5.

When the receiving time Tr of the intermediate data by the data reception unit 15 is included in the nighttime time period, the second inference unit 51 gives the intermediate data to the second learning model 17-2, and acquires the second video data indicating the daytime video, as the predicted video of the second video, from the second learning model 17-2.

The second inference unit 51 gives the intermediate data to the second learning model 17-3, when the receiving time Tr of the intermediate data by the data reception unit 15 is included in the daytime period and the first video is a video photographed in cloudy weather or a video photographed in rainy weather. Then, the second inference unit 51 acquires, from the second learning model 17-3, the second video data indicating the good-weather video, as the predicted video of the second video.

The second inference unit 51 gives the intermediate data to the second learning model 17-4, when the receiving time Tr of the intermediate data by the data reception unit 15 is included in the daytime period and the first video is a video photographed in good weather and a video photographed in a season other than the summer season. Then, the second inference unit 51 acquires the second video data indicating the summer video, as the predicted video of the second video, from the second learning model 17-4.

The second inference unit 51 outputs the acquired second video data to, for example, the display device 6 or the video processing device (not illustrated).

In the third embodiment described above, the video transmission system 2 illustrated in FIG. 11 is configured in such a way that there are the second learning models 17-1 to 17-G, the pieces of second video data output from the second learning models 17-1 to 17-G indicate the predicted videos of mutually different second videos, and the second inference unit 51 gives the intermediate data received by the data reception unit 15 to one second learning model 17-g of the second learning models 17-1 to 17-G, and acquires the second video data from the one second learning model 17-g. Therefore, similarly to the video transmission system 2 illustrated in FIG. 1, the video transmission system 2 illustrated in FIG. 11 can support a worker or the like in a remote place to issue an appropriate work instruction to the site, and can acquire a clear video or the like even when the photographing environment of the camera 1 changes.

In the video transmission system 2 illustrated in FIG. 11, the second inference unit 51 gives the intermediate data received by the data reception unit 15 to any one of the second learning models 17-1 to 17-G on the basis of the receiving time Tr of the intermediate data and the like. However, this is merely an example, and the second inference unit 51 may acquire a control signal indicating one second learning model that the intermediate data is to given among the second learning models 17-1 to 17-G, from the outside of the video transmission system 2, and give the intermediate data to the second learning model indicated by the control signal.

Fourth Embodiment

In a fourth embodiment, a video reception device 5 in which an inference unit 73 includes a learning model 30 will be described.

Figure 13:
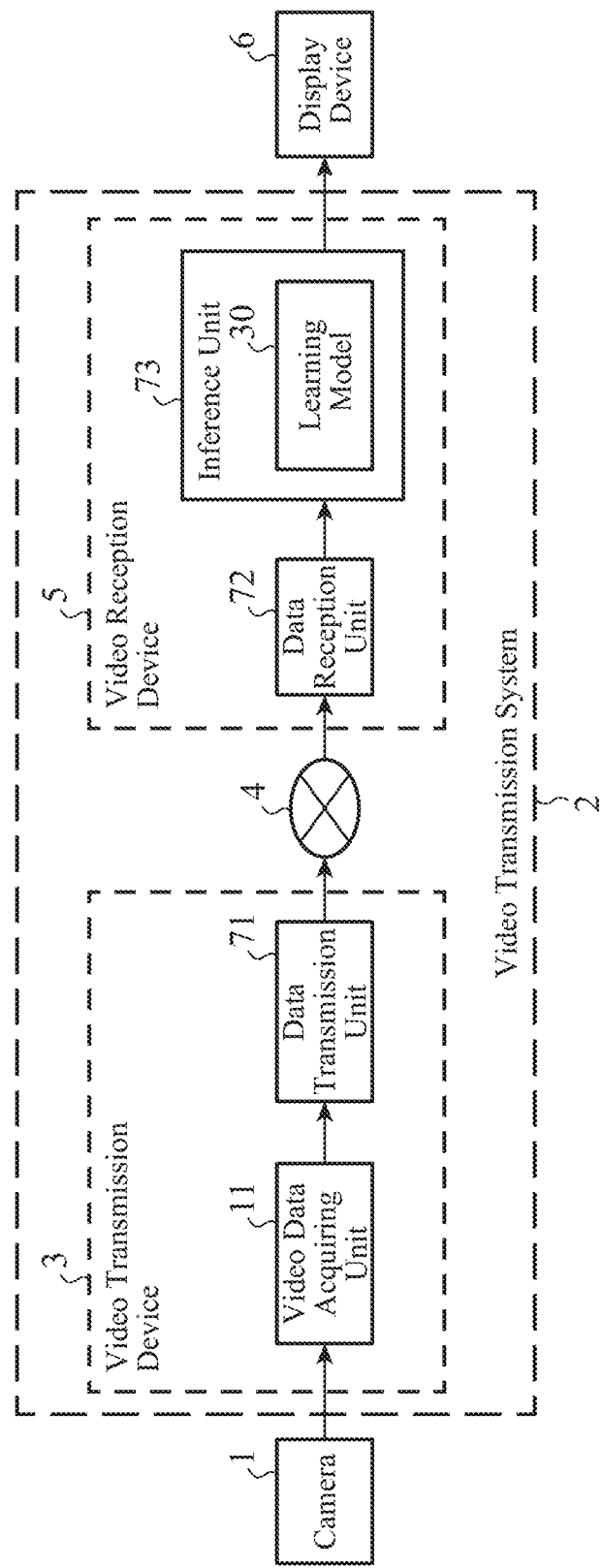
FIG. 13 is a configuration diagram illustrating a video transmission system 2 including a video reception device 5 according to a fourth embodiment.

FIG. 13 is a configuration diagram illustrating a video transmission system 2 including the video reception device 5 according to the fourth embodiment.

Figure 14:
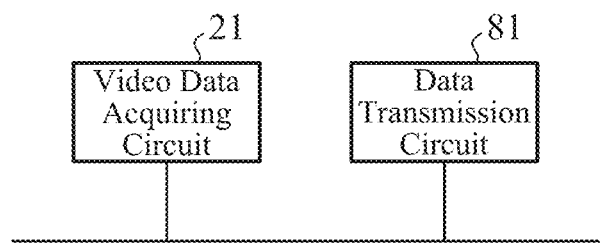
FIG. 14 is a hardware configuration diagram illustrating hardware of a video transmission device 3 included in the video transmission system 2 illustrated in FIG. 13.

FIG. 14 is a hardware configuration diagram illustrating hardware of a video transmission device 3 included in the video transmission system 2 illustrated in FIG. 13.

Figure 15:
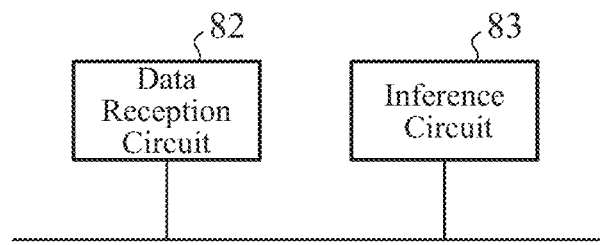
FIG. 15 is a hardware configuration diagram illustrating hardware of the video reception device 5 included in the video transmission system 2 illustrated in FIG. 13.

FIG. 15 is a hardware configuration diagram illustrating hardware of the video reception device 5 included in the video transmission system 2 illustrated in FIG. 13.

In FIGS. 13, 14, and 15, the same reference numerals as those in FIGS. 1, 2, and 3 denote the same or corresponding parts, and thus description thereof is omitted.

The video transmission device 3 includes a video data acquiring unit 11 and a data transmission unit 71.

The video reception device 5 includes a data reception unit 72 and an inference unit 73.

The data transmission unit 71 is implemented by, for example, a data transmission circuit 81 illustrated in FIG. 14.

The data transmission unit 71 transmits first video data acquired by the video data acquiring unit 11 to the data reception unit 72 via the transmission path 4.

The data reception unit 72 is implemented by, for example, a data reception circuit 82 illustrated in FIG. 15.

The data reception unit 72 receives the first video data transmitted from the data transmission unit 71.

The data reception unit 72 outputs the first video data to the inference unit 73.

The inference unit 73 is implemented by, for example, an inference circuit 83 illustrated in FIG. 15.

The inference unit 73 includes the learning model 30 illustrated in FIG. 4.

The inference unit 73 gives the first video data received by the data reception unit 72 to the learning model 30, and acquires, from the learning model 30, second video data indicating the predicted video of the second video of which the photographing time of the camera 1 is advanced from that of the first video by the transmission time of the first video data from the data transmission unit 71 of the video transmission device 3 to the data reception unit 72 or more.

In the video transmission system 2 illustrated in FIG. 13, it is assumed that the transmission time of the first video data is fixed, and in the video transmission system 2, the transmission time of the first video data is an existing value.

In the video transmission system 2 illustrated in FIG. 13, for the sake of simplicity of explanation, it is assumed that each of the processing times in the video data acquiring unit 11, the data transmission unit 71, the data reception unit 72, and the inference unit 73 can be ignored. In this case, the inference unit 73 gives the first video data received by the data reception unit 72 to the learning model 30, and acquires, from the learning model 30, the second video data indicating the predicted video of the second video of which the photographing time of the camera 1 is advanced from that of the first video by the transmission time of the first video data.

In a case where each processing time cannot be ignored, the inference unit 73 gives the first video data received by the data reception unit 72 to the learning model 30, and acquires, from the learning model 30, the second video data indicating the predicted video of the second video of which the photographing time of the camera 1 is advanced from that of the first video by the total time of each processing time and the transmission time of the first video data.

The inference unit 73 outputs the second video data to, for example, a display device 6 or a video processing device (not illustrated).

In the video transmission system 2 illustrated in FIG. 13, the inference unit 73 includes the learning model 30. However, this is merely an example, and the learning model 30 may be provided outside the inference unit 73.

In the video transmission system 2 illustrated in FIG. 13, an example is illustrated in which the data transmission unit 71, the data reception unit 72, and the inference unit 73 are used in the video transmission system 2 illustrated in FIG. 1. However, this is merely an example, and the data transmission unit 71, the data reception unit 72, and the inference unit 73 may be used in the video transmission system 2 illustrated in FIG. 9 or the video transmission system 2 illustrated in FIG. 11.

In FIG. 13, it is assumed that each of the video data acquiring unit 11 and the data transmission unit 71 which are components of the video transmission device 3 is implemented by dedicated hardware as illustrated in FIG. 14. That is, it is assumed that the video transmission device 3 is implemented by the video data acquiring circuit 21 and the data transmission circuit 81.

Further, in FIG. 13, it is assumed that each of the data reception unit 72 and the inference unit 73 which are components of the video reception device 5 is implemented by dedicated hardware as illustrated in FIG. 15. That is, it is assumed that the video reception device 5 is implemented by the data reception circuit 82 and the inference circuit 83.

Each of the video data acquiring circuit 21, the data transmission circuit 81, the data reception circuit 82, and the inference circuit 83 corresponds to, for example, a single circuit, a composite circuit, a programmed processor, a parallel-programmed processor, ASIC, FPGA, or a combination thereof.

The components of the video transmission device 3 are not limited to those implemented by dedicated hardware, and the video transmission device 3 may be implemented by software, firmware, or a combination of software and firmware.

Furthermore, the components of the video reception device 5 are not limited to those implemented by dedicated hardware, and the video reception device 5 may be implemented by software, firmware, or a combination of software and firmware.

In a case where the video transmission device 3 is implemented by software, firmware, or the like, a program for causing a computer to execute each of processing procedures in the video data acquiring unit 11 and the data transmission unit 71 is stored in the memory 41 illustrated in FIG. 5. Then, the processor 42 illustrated in FIG. 5 executes the program stored in the memory 41.

In a case where the video reception device 5 is implemented by software, firmware, or the like, a program for causing a computer to execute each of processing procedures in the data reception unit 72 and the inference unit 73 is stored in the memory 41 as illustrated in FIG. 5. Then, the processor 42 illustrated in FIG. 5 executes the program stored in the memory 41.

FIG. 14 illustrates an example in which each of the components of the video transmission device 3 is implemented by dedicated hardware, and FIG. 5 illustrates an example in which the video transmission device 3 is implemented by software, firmware, or the like. However, these are merely examples, and some components in the video transmission device 3 may be implemented by dedicated hardware, and the remaining components may be implemented by software, firmware, or the like.

FIG. 15 illustrates an example in which each of the components of the video reception device 5 is implemented by dedicated hardware, and FIG. 5 illustrates an example in which the video reception device 5 is implemented by software, firmware, or the like. However, these are merely examples, and some components in the video reception device 5 may be implemented by dedicated hardware, and the remaining components may be implemented by software, firmware, or the like.

Next, an operation of the video transmission system 2 illustrated in FIG. 13 will be described.

The camera 1 outputs first video data indicating the first video to the video data acquiring unit 11 of the video transmission system 2.

The video data acquiring unit 11 acquires the first video data output from the camera 1.

The video data acquiring unit 11 outputs the first video data to the data transmission unit 71.

The data transmission unit 71 acquires the first video data from the video data acquiring unit 11.

The data transmission unit 71 transmits the first video data to the data reception unit 72 via the transmission path 4.

The data reception unit 72 receives the first video data transmitted from the data transmission unit 71.

The data reception unit 72 outputs the first video data to the inference unit 73.

The inference unit 73 acquires the first video data from the data reception unit 72.

The inference unit 73 gives the first video data to the learning model 30, and acquires, from the learning model 30, the second video data indicating the predicted video of the second video of which the photographing time of the camera 1 is advanced from that of the first video by the transmission time of the first video data.

That is, the inference unit 73 gives the first video data to the input layer 31 and acquires the second video data from the output layer 34.

It is assumed that the transmission time of the first video data in the transmission path 4 is, for example, a time equal to the time $3 \times \Delta T$ between the photographing time $T_3$ and the photographing time $T_0$. In this case, for example, when the first video data indicating the first video at the photographing time $T_0$ is given to the input layer 31 of the learning model 30, the second video data indicating the video at the photographing time $T_3$ $(=T_0+3\times\Delta T)$ is output from the output layer 34 of the learning model 30, as the predicted video of the second video.

For example, when the first video data indicating the first video at the photographing time $T_2$ is given to the input layer 31 of the learning model 30, the second video data indicating the video at the photographing time $T_5$ $(=T_2+3\times\Delta T)$ is output from the output layer 34 of the learning model 30, as the predicted video of the second video.

The inference unit 73 outputs the second video data to, for example, the display device 6 or the video processing device (not illustrated).

In the above-described fourth embodiment, the video reception device 5 is configured in such a way as to include: the data reception unit 72 to receive the first video data indicating the first video transmitted from the video transmission device 3; and the inference unit 73 to give the first video data received by the data reception unit 72 to the learning model 30, and acquire, from the learning model 30, the second video data indicating the predicted video of the second video of which the photographing time of the camera 1 is advanced from that of the first video by the transmission time of the first video data or more. Therefore, the video reception device 5 can support a worker or the like in a remote place to issue an appropriate work instruction to the site.

In the first to fourth embodiments, the video transmission device 3 transmits the intermediate data or the first video data to the video reception device 5. In addition to the transmission of the intermediate data or the first video data to the video reception device 5 by the video transmission device 3, as illustrated in FIG. 16, the video reception device 5 may transmit an operation signal for a machine 93 present on the site to the video transmission device 3.

Figure 16:
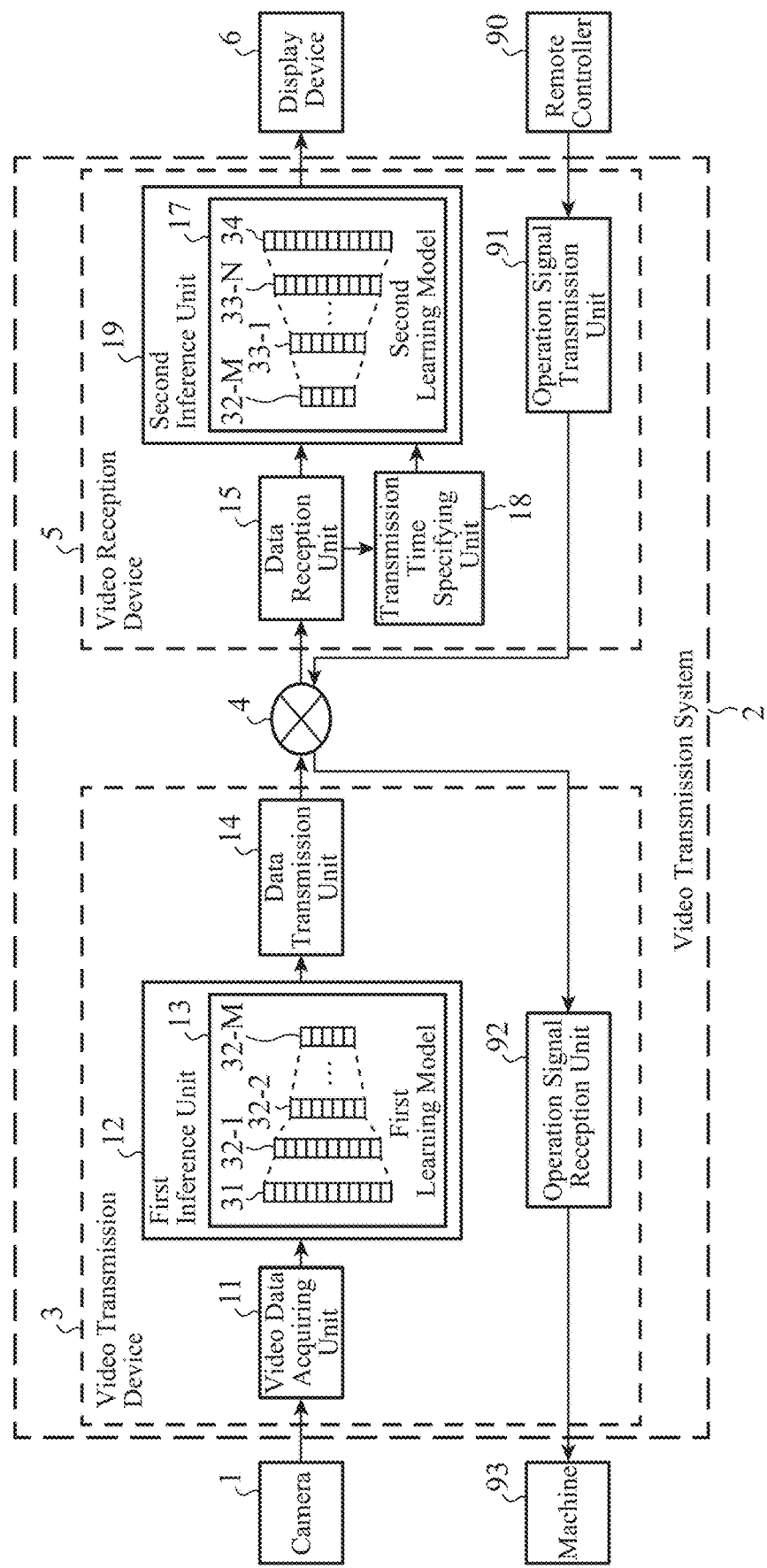
FIG. 16 is a configuration diagram illustrating another video transmission system 2 according to the first to fourth embodiments.

FIG. 16 is a configuration diagram illustrating another video transmission system 2 according to the first to fourth embodiments.

An operation signal transmission unit 91 acquires an operation signal, from a remote controller 90 enabling a worker or the like in a remote place to remotely operate the machine 93. In a case where the machine 93 is, for example, a camera, a signal including a command to change the direction of the camera is conceivable, as the operation signal. In a case where the machine 93 is, for example, a robot, a signal including a command to move a hand of the robot is conceivable, as the operation signal.

The operation signal transmission unit 91 transmits the acquired operation signal to an operation signal reception unit 92 via the transmission path 4.

The operation signal reception unit 92 receives the operation signal transmitted from the operation signal transmission unit 91, and outputs the operation signal to the machine 93.

The machine 93 is a machine present on the site. As the machine 93, for example, a robot, a car, or a camera is conceivable.

The machine 93 operates in accordance with the operation signal output from the operation signal reception unit 92.

In the video transmission system 2 illustrated in FIG. 16, the operation signal transmission unit 91 and the operation signal reception unit 92 are used in the video transmission system 2 illustrated in FIG. 9. However, this is merely an example, and the operation signal transmission unit 91 and the operation signal reception unit 92 may be used in the video transmission system 2 illustrated in FIG. 1, 11, or 13.

Note that, in the present disclosure, it is possible to freely combine each of the embodiments, to modify any component of each of the embodiments, or to omit any component in each of the embodiments.

INDUSTRIAL APPLICABILITY

The present disclosure is suitable for a video transmission system, a video transmission method, and a video reception device.

REFERENCE SIGNS LIST

1: camera, 2: video transmission system, 3: video transmission device, 4: transmission path, 5: video reception device, 6: display device, 11: video data acquiring unit, 12: first inference unit, 13: first learning model, 14: data transmission unit, 15: data reception unit, 16: second inference unit, 17: second learning model, 17-1 to 17-G: second learning model, 18: transmission time specifying unit, 19: second inference unit, 21: video data acquiring circuit, 22: first inference circuit, 23: data transmission circuit, 24: data reception circuit, 25: second inference circuit, 26: transmission time specifying circuit, 27: second inference circuit, 30: learning model, 31: input layer, 32-1 to 32-M: intermediate layer, 33-1 to 33-N: intermediate layer, 34: output layer, 41: memory, 42: processor, 51: second inference unit, 61: second inference circuit, 71: data transmission unit, 72: data reception unit, 73: inference unit, 81: data transmission circuit, 82: data reception circuit, 83: inference circuit, 90: remote controller, 91: operation signal transmission unit, 92: operation signal reception unit, 93: machine

The invention claimed is:

1. A video transmission system comprising:
video data acquiring circuitry to acquire first video data indicating a first video photographed by a camera;
first inference circuitry to give the first video data acquired by the video data acquiring circuitry to a first learning model, and acquire intermediate data that is data different from the first video data from the first learning model;
data transmission circuitry to transmit the intermediate data acquired by the first inference circuitry;
data reception circuitry to receive the intermediate data transmitted from the data transmission circuitry; and
second inference circuitry to give the intermediate data received by the data reception circuitry to a second learning model, and acquire, from the second learning model, second video data indicating a predicted video of a second video of which a photographing time of the camera is advanced from that of the first video by a transmission time of the intermediate data from the data transmission circuitry to the data reception circuitry or more.

2. The video transmission system according to claim 1, further comprising transmission time specifying circuitry to specify a transmission time of the intermediate data, from a transmitting time of the intermediate data by the data transmission circuitry and a receiving time of the intermediate data by the data reception circuitry, wherein
the second inference circuitry acquires second video data from the second learning model, the second video data indicating a predicted video of a second video whose photographing time of the camera is advanced from that of the first video by the transmission time specified by the transmission time specifying circuitry or more.

3. The video transmission system according to claim 1, wherein there is a plurality of the second learning models, pieces of second video data output from the plurality of second learning models indicate predicted videos of different second videos, and the second inference circuitry gives the intermediate data received by the data reception circuitry to one of the plurality of second learning models, and acquires second video data from the one of the second learning models.

4. The video transmission system according to claim 1, wherein a video indicated by teacher data to be given to the second learning model includes at least one of: a video photographed in a daytime, a video photographed in good weather, or video photographed in a summer season.

5. The video transmission system according to claim 1 wherein a video indicated by teacher data to be given to the second learning model is processed in such a way as to be clear.

6. A video transmission system comprising:

video data acquiring circuitry to acquire first video data indicating a first video photographed by a camera;

inference circuitry to give the first video data acquired by the video data acquiring circuitry to a first learning model, acquire intermediate data that is data different from the first video data from the first learning model, give the acquired intermediate data to a second learning model, and acquire, from the second learning model, second video data indicating a predicted video of a second video of which a photographing time of the camera is advanced from that of the first video by a transmission time of the intermediate data or more.

7. A video transmission method comprising:

acquiring first video data indicating a first video photographed by a camera;

giving the first video data acquired to a first learning model, and acquiring intermediate data that is data different from the first video data from the first learning model;

transmitting the intermediate data acquired;

receiving the intermediate data transmitted; and giving the intermediate data received to a second learning model, and acquiring, from the second learning model, second video data indicating a predicted video of a second video of which a photographing time of the camera is advanced from that of the first video by a transmission time of the intermediate data from the transmitting to the receiving or more.

8. A video reception device comprising:

data reception circuitry to receive first video data transmitted from a video transmission device and indicating a first video photographed by a camera; and inference circuitry to give the first video data received by the data reception circuitry to a learning model, and acquire, from the learning model, second video data indicating a predicted video of a second video of which a photographing time of the camera is advanced from that of the first video by a transmission time of the first video data from the video transmission device to the data reception circuitry or more.

* * * * *